May 24, 1938.  J. SINKO  2,118,573

STEERING WHEEL TURNING DEVICE

Filed April 19, 1937

Inventor:
John Sinko,
Chritton, Wiles, Davies, Kirschke Dawson,
Attys.

Patented May 24, 1938

2,118,573

UNITED STATES PATENT OFFICE 2,118,573

STEERING WHEEL TURNING DEVICE

John Sinko, Chicago, Ill.

Application April 19, 1937, Serial No. 137,847

8 Claims. (Cl. 74—557)

This invention relates to an attachment for a steering wheel, or the like, to facilitate turning the same, and more particularly to a friction bearing for securing the knob or handle on a supporting bracket and resisting relative movement between the two members.

The primary object of the invention is to provide a reliable bearing which may be easily and permanently secured together but will not permit the knob to spin.

A further object of the invention is to provide a cushioned connection between the knob and wheel which will help to absorb small shocks and prevent vibrations from being transmitted from the wheel to the hand of the operator.

Figure 1:
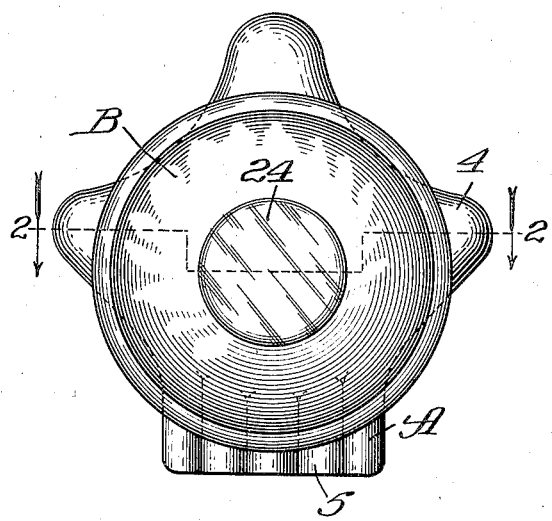
Figure 2:
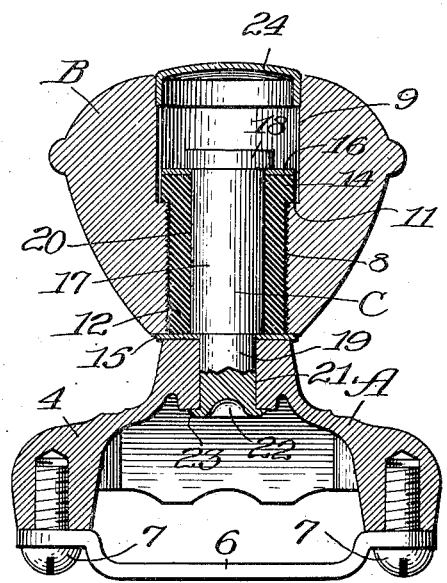
Figure 3:
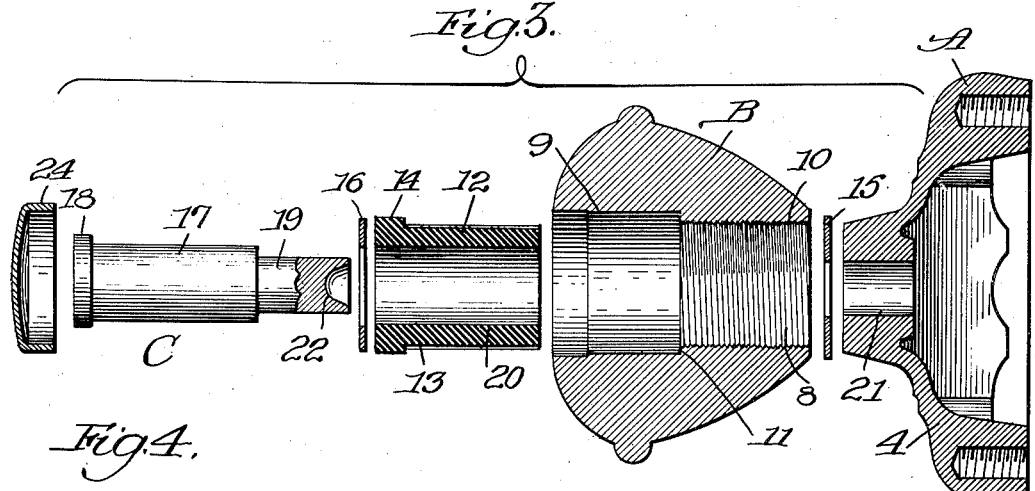

The invention is illustrated in a preferred embodiment in the accompanying drawing, in which:

Figure 1 is a plan view of a steering wheel turning device embodying the invention; Fig. 2, a broken vertical sectional view taken as indicated at line 2—2 of Fig. 1; Fig. 3, an exploded sectional view showing how the various parts are assembled to complete the assembly; and Fig. 4, a broken sectional view showing a modified construction.

In the preferred embodiment, illustrated in Figs. 1-3, A designates a supporting bracket; B, an ornamental hand knob; and C, a friction bearing which secures the members A and B together.

The bracket A is of known construction and preferably comprises a die casting 4 having an outwardly extending claw 5 adapted to engage the rim of a steering wheel adjacent a spoke connection. A clamping bar 6 may be used to grip the bracket securely against the rim and is held in position by means of screws 7.

The knob B preferably is made of some insulating material such as "catalin" and may be given a suitable finish to imitate marble, or the like. The knob is provided with a main bore 8 and a counter bore 9 through which the connecting bearing may be inserted during the assembling operation. Preferably the main bore is tapped to provide screw threads 10 which frictionally engage small longitudinal ribs provided on a bushing described below. The counter bore provides a shoulder 11 which is engaged by a flange on the outer end of the bushing.

The anti-friction bearing comprises a rubber bushing 12 adapted to fit snugly within the bore 8 and preferably is provided with small longitudinal ribs 13 which are engaged by the threads in the bore and help to prevent rotation between the bushing and the knob. Thus it will be understood that a threaded connection is not provided but that the bushing is merely pressed into position. The outer end of the bushing is provided with a flanged end 14 which is adapted to bear against the shoulder 11 of the knob. After the bushing has been inserted, a bearing washer 15 is placed between the knob and supporting bracket and a washer 16 is placed on the flange 14. A trunnion member 17, provided with an enlarged head 18 and a reduced shank 19, is then inserted through the inner bore 20 of the bushing and a socket 21 provided in the supporting bracket A. The inner end of the shank portion preferably is hollowed out as indicated at 22 so that its edge portions may be turned outwardly or riveted as indicated at 23. Thus it will be seen that the trunnion is fixedly mounted on the supporting member and clamps the washer 15 firmly in position. The head portion 18 bears against the washer 16 and compresses the flange 14 against the shoulder 11. This arrangement causes a comparatively snug fit between the metal trunnion 17 and the bushing 12. The washer 16 prevents the head from being pulled through the main bore and prevents spinning of the knob on the support. After the bearing has been assembled, an inverted cup like metal member 24 is forced into the counter bore and makes a snug pressed fit so that the bearing is sealed up.

Thus it will be understood that a friction bearing is provided that is durable and positive, requires no lubrication, and is adapted to absorb shocks or vibrations which might otherwise be transmitted from the bracket to the knob.

Figure 4:
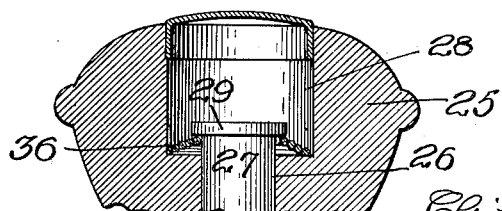

In the modification shown in Fig. 4, the rubber bushing is omitted. The knob 25 has a main bore 26, which serves as a journal for trunnion member 27, and a counter bore 28 to receive the head 29. A compression spring 30 is interposed between the head of the trunnion and the end of the counter bore. The spring is under sufficient compression to hold the knob firmly on the bracket and yieldingly resist rotation therebetween.

The foregoing detailed description has been given for clearness of understanding only, and no unnecessary limitations should be understood therefrom, but the appended claims should be construed as broadly as permissible, in view of the prior art.

I claim:

1. In combination: a supporting bracket; a knob rotatably mounted on said bracket; and a friction device for securing the members together and resisting relative movement therebetween comprising a rubber bushing for one of said members and a trunnion member secured to the other member and journalled in said bushing.

2. In combination: a supporting bracket; a knob rotatably mounted on said bracket; and a friction device for securing the members together and resisting relative movement therebetween comprising a rubber bushing for one of said members and a trunnion member journalled in said bushing and disposed so as to compress said bushing longitudinally.

3. A steering wheel turning device comprising a supporting bracket secured to the steering wheel; a hand knob rotatably mounted on said bracket; and a friction bearing for clamping said knob and bracket together, said bearing having a rubber journal for resisting movement of the knob with respect to said bracket.

4. A steering wheel turning device comprising: a supporting bracket; a hand knob having a main bore extending therethrough and a counter bore at the outer end of said knob; a rubber bushing in said main bore having a flanged end in said counter bore; and a trunnion member fixed to said bracket and impaling said bushing, said trunnion member having an enlarged head for compressing the bushing against the bracket portion.

5. A device as specified in claim 4, in which the ends of the bushing bear against metal washers, and the lower end of the trunnion is riveted to the bracket.

6. A device as specified in claim 4, in which the main bore is provided with screw threads and the bushing is provided with longitudinal ribs to engage said threads, said bore having its outer end sealed with an inverted cup-shaped member forced into the counter bore.

7. A steering wheel turning device comprising: a supporting bracket; a hand knob having a main bore extending therethrough and a counter bore at the outer end of said knob; a trunnion member fixed to said bracket and journalled in said main bore, said trunnion member having an enlarged head in said counter bore; and yielding means compressed between said head and the inner end of the counter bore to resist frictionally rotation of the knob with respect to said bracket.

8. A device as specified in claim 7, in which the yielding means comprises a metallic compression spring.

JOHN SINKO.